United States Patent
Waas et al.

(10) Patent No.: US 6,598,044 B1
(45) Date of Patent: Jul. 22, 2003

(54) METHOD FOR CHOOSING OPTIMAL QUERY EXECUTION PLAN FOR MULTIPLE DEFINED EQUIVALENT QUERY EXPRESSIONS

(75) Inventors: Florian Waas, Seattle, WA (US); Cesar Galindo-Legaria, Redmond, WA (US); Goetz Graefe, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/183,190

(22) Filed: Jun. 25, 2002

(51) Int. Cl.[7] ................................. G06F 17/30

(52) U.S. Cl. ............................. 707/3; 707/103

(58) Field of Search ..................... 707/1, 2, 3, 4, 707/7, 10, 102, 103; 712/18

(56) References Cited

U.S. PATENT DOCUMENTS

| | | | | |
|---|---|---|---|---|
| 5,590,362 A | * | 12/1996 | Baum et al. | 707/4 |
| 6,108,648 A | * | 8/2000 | Lakshmi et al. | 707/2 |
| 6,289,334 B1 | * | 9/2001 | Reiner et al. | 707/3 |

OTHER PUBLICATIONS

Gupta, A.; Sudarshan, S.; Vishwanathan, S.; discloses Query scheduling in multi query optimization: Database Engineering & Applications, 2001 International Symposium on., 2001 : pp.: 11–19.*

Wei Sun; Yu, C.T.; discloses Semantic query optimization for tree and chain queries : Knowledge and Data Engineering, IEEE Transactions on , vol.: 6 Issue: 1, Feb. 1994: pp.: 136–151.*

Graefe, G. "The Cascades Framework for Query Optimization", *IEEE Data Engineering Bulletin*, Sep. 1995, 18(3), 19–29.

* cited by examiner

*Primary Examiner*—Diane D. Mizrahi
(74) *Attorney, Agent, or Firm*—Woodcock Washburn LLP

(57) ABSTRACT

A query formulates choices of multiple equivalent forms. A choice is represented by a CHOOSE operator having multiple arguments representing the equivalent forms. A lookup table is generated to include a group for each node other than CHOOSE arguments. For CHOOSE arguments, the generated table includes a single equivalence group having all choose arguments as members. The enumeration algorithm of the optimizer is applied to generate additional members and/or groups, whereby for each group, every member thereof is an equivalent. A cost value is assigned to each member of each group and a member of each group is selected as a lowest cost value member. The lowest cost value members of the groups define an optimized tree and optimization of the query.

9 Claims, 7 Drawing Sheets

| GROUP 14 | MEMBERS |
|---|---|
| ROOT | 3 JOIN 4 |
| 4 | SCAN C |
| 3 | 1 JOIN 2 |
| 2 | SCAN B |
| 1 | SCAN A |

12

| GROUP 14 | MEMBERS |
|---|---|
| ROOT | 3 JOIN 4, 4 JOIN 3, 5 JOIN 2, 2 JOIN 5, 6 JOIN 1, <u>1 JOIN 6</u> |
| 6 | <u>4 JOIN 2</u>, 2 JOIN 4 |
| 5 | 1 JOIN 4, 4 JOIN 1 |
| 4 | <u>SCAN C</u> |
| 3 | 1 JOIN 2, 2 JOIN 1 |
| 2 | <u>SCAN B</u> |
| 1 | <u>SCAN A</u> |

| GROUP 14 | MEMBERS |
|---|---|
| ROOT | 1 JOIN 2 |
| 2 | SCAN C |
| 1 | SCAN A, SCAN B |

12

US 6,598,044 B1

METHOD FOR CHOOSING OPTIMAL QUERY EXECUTION PLAN FOR MULTIPLE DEFINED EQUIVALENT QUERY EXPRESSIONS

TECHNICAL FIELD

The present invention relates to a method for choosing from among several submitted equivalent query expressions for execution in connection with a database or the like. More particularly, the present invention relates to such a method for choosing the most efficient query expression from among various alternatives derived from the equivalent query expressions, based on query optimization techniques.

BACKGROUND OF THE INVENTION

In connection with a complex database system such as a relational database system or other database system, information is stored in multiple tables that typically cross-reference amongst themselves. Typically, a query language and query evaluator are employed to access and employ the information stored in such a database system. One example of such a query language and query evaluator are provided by MICROSOFT SQL SERVER, distributed by MICROSOFT Corporation of Redmond, Wash.

A query evaluator such as may be included in a database management system (DBMS) typically includes a query optimizer to optimize a received query as written in the query language. Note that a query as defined may contain multiple query sub-expressions (hereinafter 'expressions') joined by various defined query commands. In turn, each query expression may contain multiple query expressions joined by query commands. Query optimization is generally known, and is performed according to known rules based on the database being queried and the structure thereof. Generally, a query optimizer generates multiple alternatives based on the received query, and then selects the most efficient of the alternatives for execution.

At times, a query expression within a query as submitted by a user or as written in an application can take on multiple alternate forms, where each form should produce the same result. Depending on the underlying layout of database tables, these equivalences cannot always be inferred by the optimizer. However, the user or the application does not know which form is most efficient, and therefore does not know which form to submit as the preferred query expression. Essentially, the user or the application cannot pre-submit each form of the query expression to the query optimizer and then choose the most efficient of the forms as optimized by such query optimizer.

Accordingly, a need exists for a method and mechanism that allows the user to in fact submit multiple alternate forms of a query expression in a manner so that the query optimizer selects the most efficient one of the forms of the query expression and optimizes same

SUMMARY OF THE INVENTION

The aforementioned need is satisfied by the present invention in which a query including therein at least one choice of a pair of equivalent expressions is optimized. The query comprises operators and arguments relating to the operators, and each choice is represented by a CHOOSE operator having a pair of CHOOSE arguments representing the corresponding pair of equivalent forms.

An initial tree representation of the query includes a node for each operator and each argument thereof. Each argument relating to an operator is represented in the tree as a child node of the node representing such operator. An initial version of a lookup table is generated to include a group for each node of the initial tree other than the nodes for each CHOOSE operator and the CHOOSE arguments thereof. The generated lookup table includes with regard to each CHOOSE operator node and the CHOOSE argument nodes thereof a single group having both CHOOSE argument nodes as members thereof. Each operator is represented as a member within a group thereof as the operator and a reference to a group of each argument associated therewith.

Transformation rules or the like may be applied to each member in each group of the initial version of the table to generate at least one of an additional member of a group, a new member of a new group, and combinations thereof, whereby for each group, every member thereof is an equivalent. A cost value is assigned to each member of each group and a member of each group is selected as a lowest cost value member of the group. The assigned cost value of each member reflects a cost of such member and if the member implies one or more other groups a cost of the lowest cost value member of each implied group. The lowest cost value members of the groups define an optimized tree for the query and thereby an optimization of the query.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
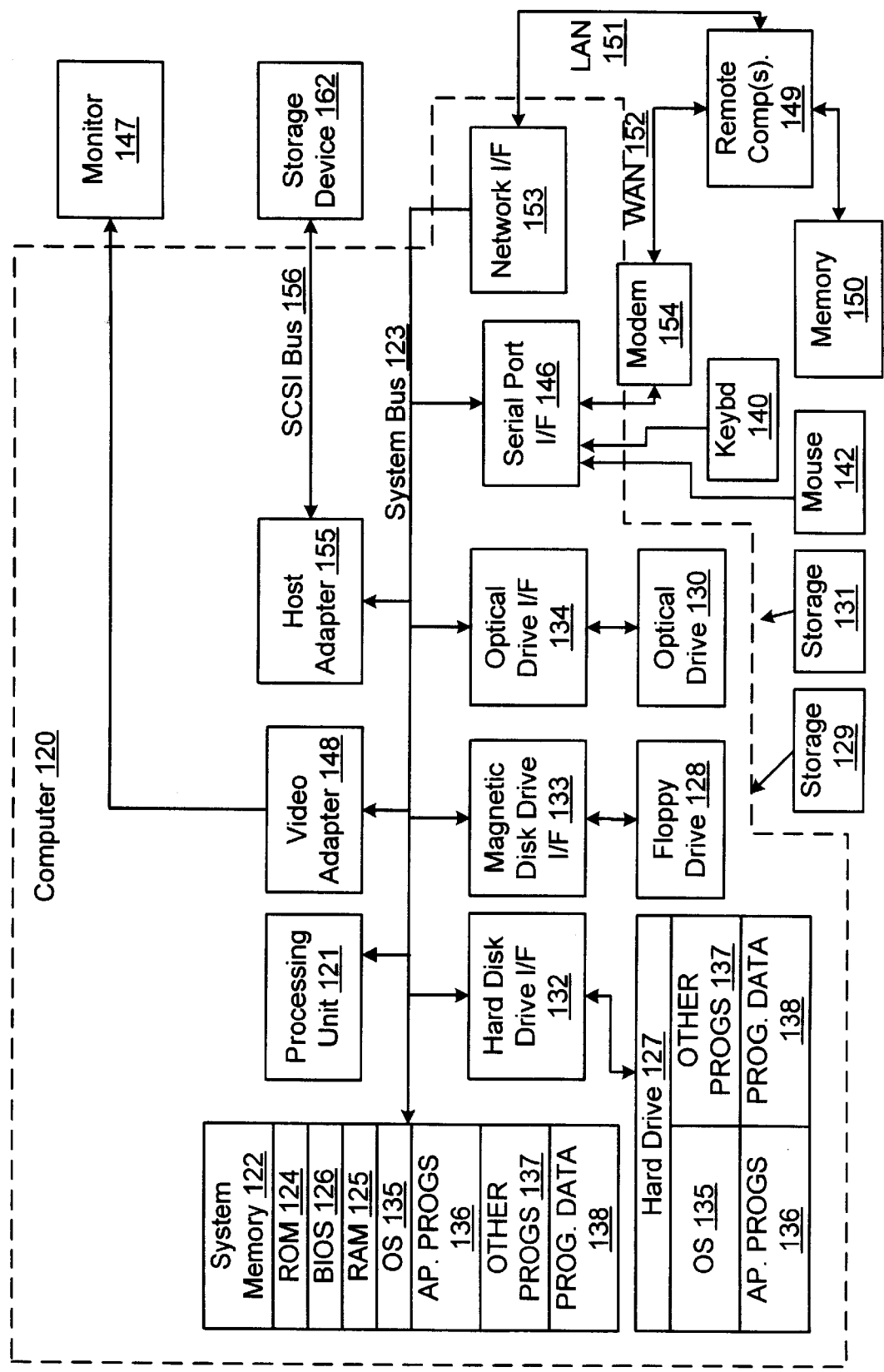
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

In the present invention, a user or an application submits a query indicating multiple semantically equivalent forms for some query expressions to a query optimizer of a query evaluator, the query optimizer selects the most efficient one of the forms of the query expression and optimizes same, and the selected optimized query is executed on a predetermined database. In particular, the query language employed by the user of the application includes a 'CHOOSE' construct that allows such user or such application to declare that two forms of a query expression indeed equivalent, at least in terms of the results produced thereby.

Equivalences of relational expressions are basic to the design and operation of a query optimizer. Early optimizers showed that join reordering and pushing down selects (i.e. exploiting algebraic properties of join and select) could bring order-of-magnitude performance improvements over naive execution of queries, effectively making practical the use of high-level, declarative query languages. Over time, other useful equivalences have been identified, opening up new query execution strategies. Currently, a considerable body of literature exists on equivalences for relational expressions, dealing with operators such as semi-join, outer-join, and group by, to name just a few. In each case, the equivalent expressions again lead to order-of-magnitude performance improvements for specific queries and data distributions. Additional equivalences can be derived when constraints declared on a database are taken in conjunction with algebraic properties. Uniqueness, check constraints, and foreign-key constraints can be used to detect empty sub-expressions, simplify and reorder group by, and eliminate unnecessary joins.

Equivalent Forms of a Query Expression

In addition to equivalence information that can be coded 'natively' in a query optimizer, a user or application developer often knows equivalences that cannot be effectively declared using current constraint mechanisms. For example, and turning now to FIG. 2, consider an OLAP engine that uses a relational database to store results of partial aggregations from sales data. Detail data 201 is stored in a table detail (amount, customer, date, product, store, etc.). Each customer has a rating, computed based on a total purchase amount. Based on such a customer rating, the OLAP engine materializes aggregations including:

total sales per customer:

> tableC 203 (customer, sales, customerrating)=select customer, sum(amount), computerating(sum(amount)) from detail group by customer total sales per customer rating, product, and store:

> tableCrPS 205 (customerrating, product, store, sales)=select customerrating, product, store, sum(amount) from detail d join tableC tC on d.customer=tC.customer group by customerrating, product, store and total sales per customer rating, product, and date:

> tableCrPD 207 (customerrating, product, date, sales)=select customerrating, product, date, sum(amount) from detail d join tableC tC on d.customer=tC.customer group by customerrating, product, date Now, suppose a user asks for a result 209 including the total sales per product and customer rating. As should be appreciated from FIG. 2, such information can be computed by further aggregating either of the two pre-aggregated tables, tableCrPS 205 or tableCrPD 207. Put another way, such a query expression can take at least two equivalent forms. However, and importantly, it is likely not immediately known which form of the query expression should be submitted. More particularly, it is likely not immediately known which form of the query expression can be executed most efficiently based on the structure of the database shown in FIG. 2. Typically, the most efficiently executed query expression depends on the data distribution within the database and any database indexes that are available.

The CHOOSE Operator

In one embodiment of the present invention, then, both forms of the query expression are submitted to the OLAP engine by way of a 'CHOOSE' operator, and a query optimizer associated with the OLAP engine thereby associates both forms of the query expression as being equivalents. In one scenario, the CHOOSE operator acts as a function with two or more inputs, each input corresponding to a form of the query expression. In another scenario, the CHOOSE operator couples a pair of the forms of the query expression and is syntactically inserted therebetween. Note that in the latter case, multiple nested CHOOSE operators may be employed to couple greater numbers of forms of the query expression.

In either case, the result of a CHOOSE operator is that one of the coupled pair of forms of the query expression is chosen by the query optimizer for execution and is in fact executed. Note that the query optimizer is presumed to choose the form that is most efficient based on an expected cost that takes into consideration computer resources, time, etc. Of course, the query optimizer may choose based on any other appropriate rationale without departing from the spirit and scope of the present invention. Essentially, the query optimizer chooses based on the user-defined equivalence between the forms of the query expression that is inherent in the CHOOSE operator. Thus, as the query optimizer generates "native" equivalents, the query optimizer also defines the forms of the query expression as defined by the CHOOSE operator as "user" equivalents and treats the native and user equivalents in a like manner.

Figure 2:
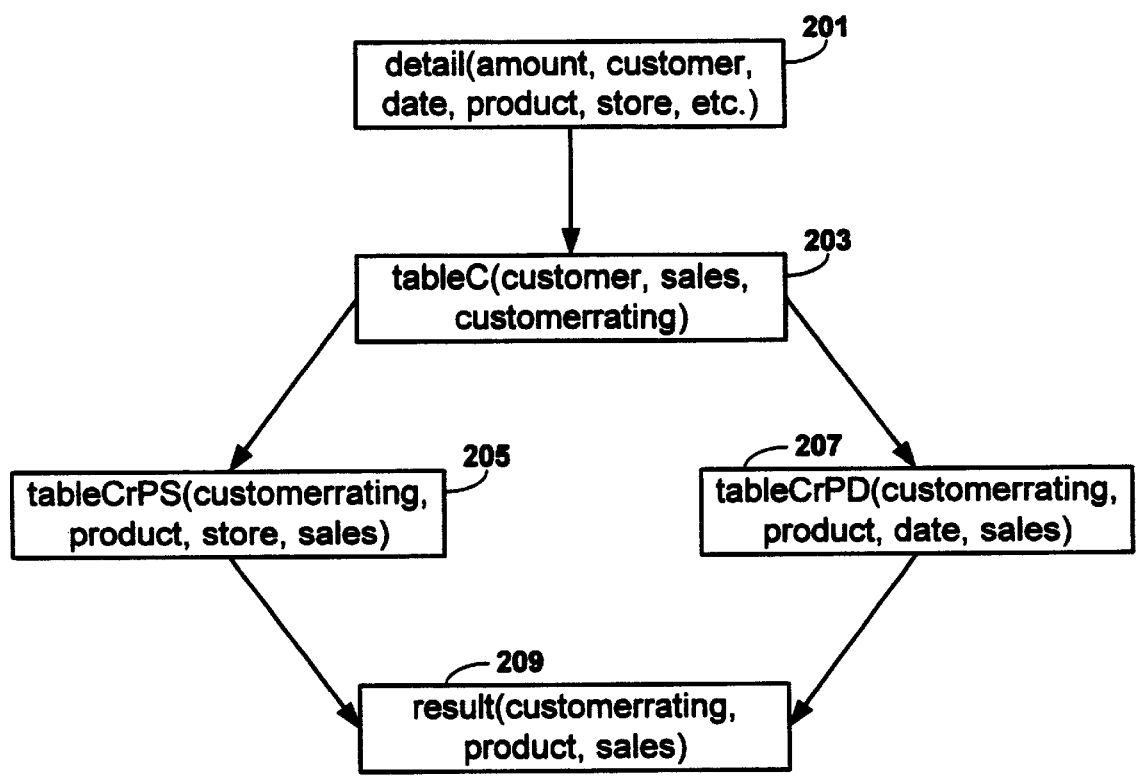
FIG. 2 is a block diagram showing at least a portion of a relational database that stores results of partial aggregations from sales data, where the result of a query may be derived from either of two forms of the query, each form based on a different table in the database.

For the OLAP database of FIG. 2, total sales per product and customer ranking can be defined by the following view: define viewCrP(customerrating, product, sales) as select customerrating, product, sum(sales)

from tableCrPS group by customerrating

CHOOSE select customerrating, product, sum(sales)

from tableCrPD group by customerrating

That is, a query expression for total sales per product and customer ranking can be represented as a syntactical statement A CHOOSE B, where A represents a select from tableCrPS 205 and B represents a select from tableCrPD 207. Note that the CHOOSE is fully compositional with other data operators. It need not be used as the topmost operator but can be used in arbitrary sub-queries, derived tables, or views.

In one embodiment of the present invention, such view or query can then be submitted to a query optimizer, where such query optimizer then selects the more efficient form of the query expression. In such embodiment, it may also be the case that such query expression is submitted as a sub-part of a larger query to the query optimizer, where the query optimizer then selects the more efficient form of the query expression as part of optimizing the larger query.

Query Optimizer

In one embodiment of the present invention, the CHOOSE operator is integrated into an algebraic query optimizer that is based on a memo-izing optimizer framework such as that employed in commercial products including the aforementioned MICROSOFT SQL SERVER as distributed by MICROSOFT Corporation of Redmond, Wash. Of course, other frameworks may be employed without departing from the spirit and scope of the present invention.

Figures 3, 4:
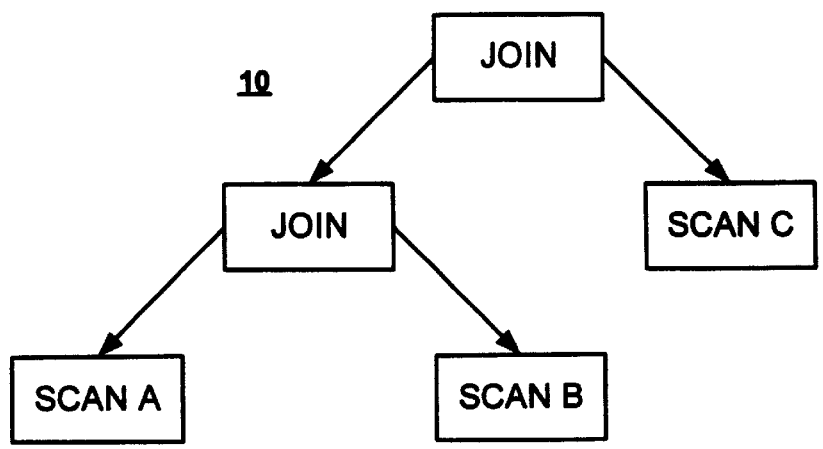
FIG. 3 is a block diagram showing a query algebra-ized into an n-level tree.
FIG. 4 is a block diagram showing an initial table of groups formed by a query optimizer based on the tree of FIG. 3.

A general description of such a query optimizer framework is as follows:

Turning now to FIG. 3, it is seen that a query to be executed may be algebra-ized into an n-level tree 10, where each node of the tree 10 corresponds to an operator or argument of an extended relational algebra. Here, the tree 10 is based on the query:

(Scan A JOIN Scan B ) JOIN Scan C

Note that an argument of an operator may in some instances be another operator (the first JOIN with regard to the second JOIN, e.g.) or an actual argument (Scan A with regard to the first JOIN, e.g.)

As seen, the result of the query is at the top or apex of the tree 10 and the nodes are applied according to the tree structure, from the bottom up. As a consequence, each node represents a sub-result, and the sub-result from an nth layer is applied to a linked node at an (n+1)th layer up to achieve another sub-result or to achieve the result of the query at the top or apex layer.

Importantly, the query optimizer employs a cost function to estimate the cost of achieving each sub-result and the result. Costs functions are generally known or should be apparent to the relevant public and therefore need not be described herein in any detail. Typically, the cost function provides an estimate for the time needed to achieve the sub-result, although the cost function may provide any other type of estimate without departing from the spirit and scope of the present invention.

Significantly, the query optimizer considers each node (including each operator and each argument) within the tree 10 as a partial plan having a sub-result, and for each partial plan generates any known semantically equivalent plans. Using the cost function, then, the query optimizer determines the cost of each partial plan and the equivalents thereof, and selects the least costly one from among all of same.

Turning now to FIG. 4, it is seen that information about each operator and each argument of FIG. 3 and its equivalents and the costs thereof is maintained in a lookup table or structure 12 that holds all operators/arguments and equivalents thereof to be considered by the query optimizer during the optimization process. The lookup table 12 is organized in groups 14, where each group 14 has an entry in the table 12. Each group 14 contains all operators/arguments and equivalents thereof which implement a given sub-result.

Figure 5:
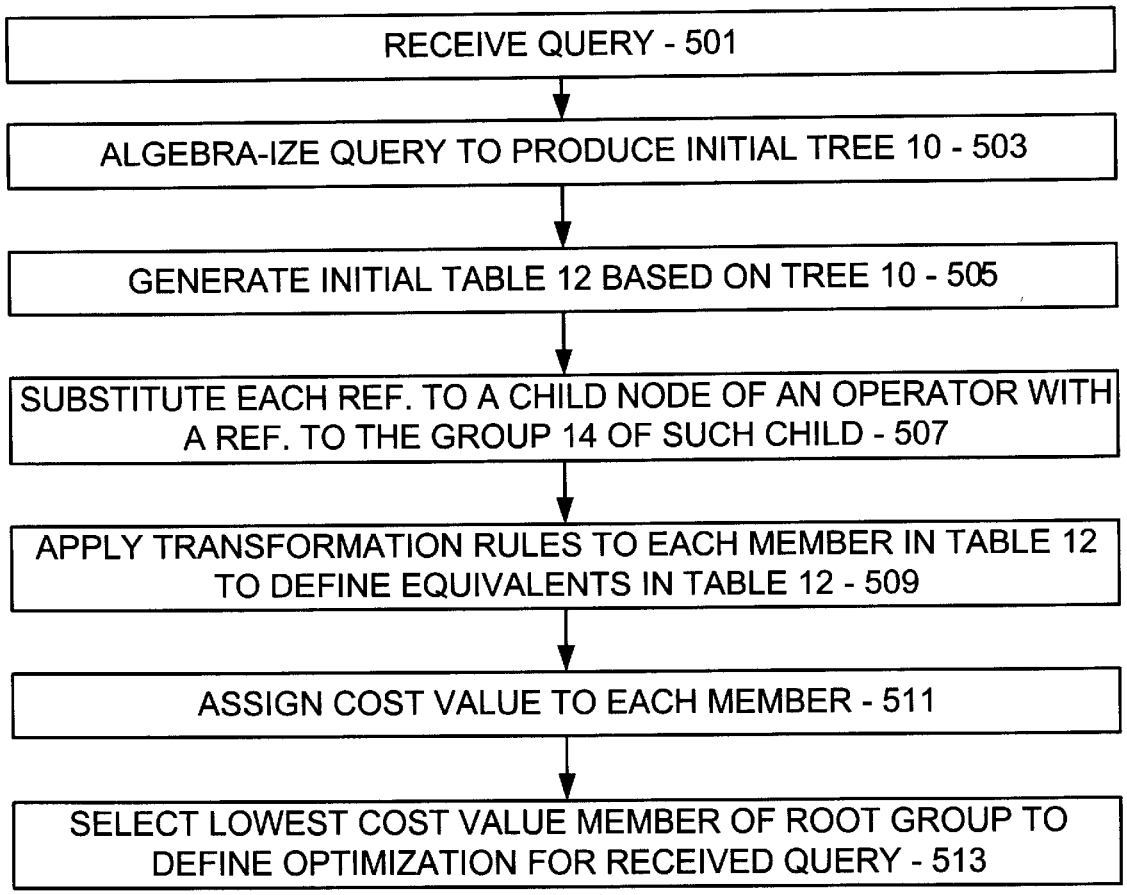
FIG. 5 is a flow diagram showing steps performed by the query optimizer in optimizing the query as represented by the tree of FIG. 3 based on the table of FIG. 4.

Turning now to FIG. 5, it is seen that the query is initially received by the query optimizer (step 501) and the query optimizer algebra-izes the query as received to produce an initial tree 10 such as that of FIG. 3 (step 503). Note that such tree 10 may be impliedly or in fact constructed. Typically, executing the query as received is sub-optimal; thus the need for the optimizer. The query optimizer begins by generating an initial version of the lookup table 12 such as that shown in FIG. 4 (step 505). Note that within the table 12, every node from the tree of FIG. 3, including operators and arguments, is assigned to a different group 14. Each argument is represented within a group 14 thereof as the argument itself, while each operator is represented within a group 14 thereof as the operator and the arguments associated therewith (i.e., the children of the node of the operator). Each reference to a child node of an operator is thus substituted by a reference to the group 14 of such child (step 507). Hence, each operator in the table 12 no longer refers to an argument or other operator but instead refers to a corresponding group 14 having the argument or other operator. The group 14 which represents the top or apex level of the tree 10 (i.e., the ultimate result) is referred to as the root group 14.

Thus, and to summarize, the tree 10 as shown in FIG. 3 has three levels including a root (first) level with a first JOIN operator joining a second JOIN operator and a Scan C operator from the next (second) level, and the second JOIN operator joins a Scan A operator and Scan B operator from the next (third) level. Correspondingly, the initial table 12 as shown in FIG. 4 has five groups 14: Group 1 has Scan A as a member, Group 2 has Scan B as a member, Group 3 has the second JOIN of Group 1 (having Scan A) and Group 2 (having Scan B) as a member, Group 4 has Scan C as a member, and the Root Group has the first JOIN of Group 3 (having the second JOIN) and Group 4 (having Scan C) as a member.

During the actual optimization process, transformation rules may be applied to each member in the table 12 of FIG. 4 (step 509). Such transformation rules are generally known or should be apparent to the relevant public and therefore need not be discussed herein in any detail. In general, the outcome of any particular transformation on a particular member can be one or more member operators which are each an equivalent of and thus go to the same group 14 as the particular member, or multiple members that span several groups 14, perhaps including new groups 14. Great care is taken to ensure that the transformations span the entire search space.

Significantly, it is to be noted that transformation rules are merely one technique employed to generate multiple. equivalent forms. Accordingly, any other appropriate technique for generating multiple equivalent forms may be employed without departing from the spirit and scope of the present invention. In general, the table 12 of alternatives is used to enumerate multiple equivalent forms of each expression of the query. Such enumeration is achieved algorithmically in a variety of ways; including the aforementioned transformation rules and dynamic programming join enumeration. In any case, an algorithm is used by the enumeration component of the query optimizer to generate multiple equivalent forms for each query expression, based on known properties of the operators and constraints declared in the database.

Figures 6, 7:
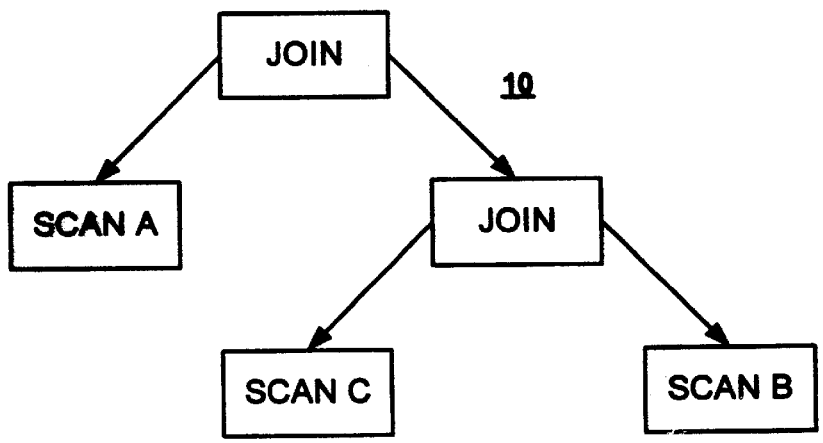
FIG. 6 is a block diagram showing the table of FIG. 4 after transformation rules are applied to provide additional equivalent members for groups and/or additional groups.
FIG. 7 is a block diagram showing the tree of FIG. 3 optimized based on the lowest cost value member of each group of the table of FIG. 6.

FIG. 6 shows the table 12 after the transformation rules are applied. As can be seen, based on the transformation, Group 3 now has 2 JOIN 1 as a member in addition to and as an equivalent of the 1 JOIN 2 member initially present, and the Root Group now has 4 JOIN 3 as a member in addition to and as an equivalent of the 3 JOIN 4 member initially present. In addition, Groups 5 and 6 have been added with new members and the Root Group has additional equivalent members to reflect that the first and second JOINs can be performed in a different order, essentially.

Once all equivalent members are defined in the table 12, the query optimizer then assigns a cost value to each member which not only reflects the cost of the individual member but also the cost of the least costly members implied by such individual member (step 511). Thus, to calculate a lowest cost member of a 'parent' group, each 'child' group referenced by any member of the parent group must first have a calculated lowest cost member. In particular, to calculate the lowest cost value of the Root Group, the query optimizer figuratively starts at the bottom of the tree of FIG. 3 and works its way upward to get to the top or apex.

Specifically, the query optimizer: calculates a cost value for Scan A and therefore the lowest cost value for Group 1; calculates a cost value for Scan B and therefore the lowest cost value for Group 2; calculates cost values for 1 JOIN 2 and 2 JOIN 1 based on the lowest cost values of Groups 1 and 2 and selects the lower as the lowest cost value for Group 3, calculates a cost value for Scan C and therefore the lowest cost value for Group 4; calculates cost values for 1 JOIN 4 and 4 JOIN 1 based on the lowest cost values of Groups 1 and 4 and selects the lower as the lowest cost value for Group 5; calculates cost values for 4 JOIN 2 and 2 JOIN 4 based on the lowest cost values of Groups 2 and 4 and selects the lower as the lowest cost value for Group 6; and then calculates cost values for 3 JOIN 4, 4 JOIN 3, 5 JOIN 2, 2 JOIN 5, 6 JOIN 1, and 1 JOIN 6 based on the lowest cost values of Groups 1–6 and selects the lowest as the lowest cost value for the Root Group. For ease of reference, each lowest cost value member as selected from a group 14 (underlined in FIG. 6) is identified for future reference. For example, the selected member may be marked, or all other members of the group 14 may be discarded so that only such lowest cost value member remains.

Moreover, when the lowest cost value member of the Root Group is selected, such selected member implicitly define the optimization for the query that was originally received by the query optimizer (step 513). For example, if the selected member of the Root Group is 1 JOIN 6, then the lowest cost value member of Group 1 (Scan A) is joined with the lowest cost value member of Group 6. Similarly, the process is repeated until an optimized tree for the optimized query is fully defined . In particular, if the selected member of the Group 6 is 4 JOIN 2, then the lowest cost value member of Group 4 (Scan C) is joined with the lowest cost value member of Group 2 (Scan B). Such an optimized tree 10 based on such selected members is shown in FIG. 7.

As should now be appreciated, in query optimization, selecting the lowest cost value member of each group 14 guarantees that the lowest cost value is selected for each subsequent group 14 and in turn guarantees that the lowest cost value is selected for the Root Group. Moreover, by working from the selected member of the Root Group back, the optimized query tree 10 is found, and may then be executed to produce query results in the most cost effective manner known.

The above description can be extended in a straightforward way to other optimizer architectures using a different representation of the table of alternatives, or populating such table by means other than transformation rules. In particular, the concept can be applied to optimizers based on the well-known bottom-up enumeration technology used in a number of commercial query optimizers.

The CHOOSE Operator and the Query Optimizer

In one embodiment of the present invention, the CHOOSE operator and the CHOOSE arguments thereof are applied to the query optimizer as summarized above to allow multiple forms of a query expression to be submitted to the query optimizer. In particular, the CHOOSE operator of the present invention defines the CHOOSE arguments thereof (i.e., the alternative but equivalent query expressions embodied in the operands) as equivalents, and takes advantage of the fact that the query optimizer operates by selecting from among equivalents based on the most efficient (least cost value, e.g.) one of the equivalents. Thus, the CHOOSE operator in effect submits the defined equivalent CHOOSE arguments to the query optimizer, and the query optimizer then selects the more efficient of the CHOOSE arguments (or an equivalent thereof).

Figures 8, 9:
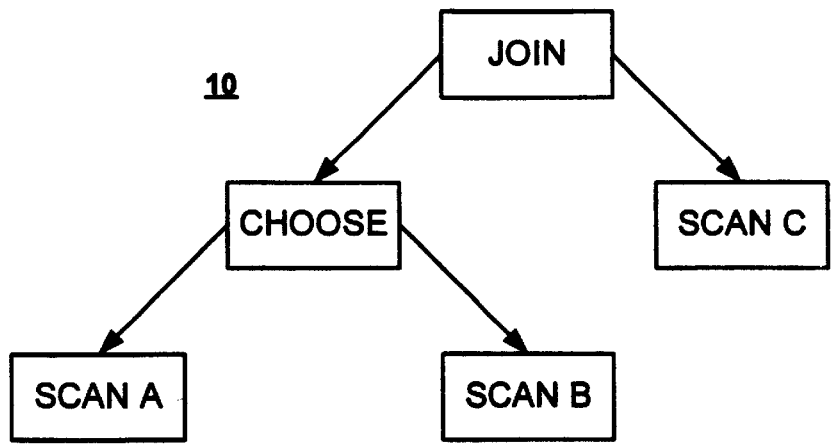
FIG. 8 is a block diagram showing another query algebra-ized into an n-level tree, where the query includes a CHOOSE operator in accordance with one embodiment of the present invention.
FIG. 9 is a block diagram showing an initial table of groups formed by a query optimizer based on the tree of FIG. 8 in accordance with one embodiment of the present invention, where the effect of the CHOOSE operator is that a single group in the initial table includes every CHOOSE argument of the CHOOSE operator inasmuch as such CHOOSE operator declares such CHOOSE arguments to be equivalents.

More particularly, and referring now to FIG. 8, it is seen that a query to be executed includes a CHOOSE operator having a pair of arguments representing equivalent query expressions and is algebra-ized into an n-level tree 10 as shown. Here, the tree 10 is based on the query:

(Scan A CHOOSE Scan B) JOIN Scan C

Note that the CHOOSE operator is not necessarily restricted to having only a pair of arguments. Instead, the CHOOSE operator may have any number of arguments without departing from the spirit and scope of the present invention. Note, too, that nesting of CHOOSE operators and other similar types of devices may be employed to in effect define multiple equivalent query expressions.

Turning now to FIG. 9, the table 12 corresponding to the tree 10 of FIG. 8 is shown. Significantly, based on the equivalency defined by the CHOOSE operator as between Scan A and Scan B (i.e., the CHOOSE arguments), one of the defined groups 14 (group 1) includes 1 (i.e., Scan A) and 2 (i.e., Scan B). That is, based on the CHOOSE operator, the query optimizer places the CHOOSE arguments thereof in a single group 14. The CHOOSE operator does not itself appear in any group 14 of the table 14, but instead is replaced by the CHOOSE arguments thereof as assigned to the aforementioned single group 14 (Group 3 in FIG. 4). The subsequent JOIN in the Root Group which previously referenced the CHOOSE operator in the tree 12 now references the single group 14 having the CHOOSE arguments of the CHOOSE operator.

Figure 10:
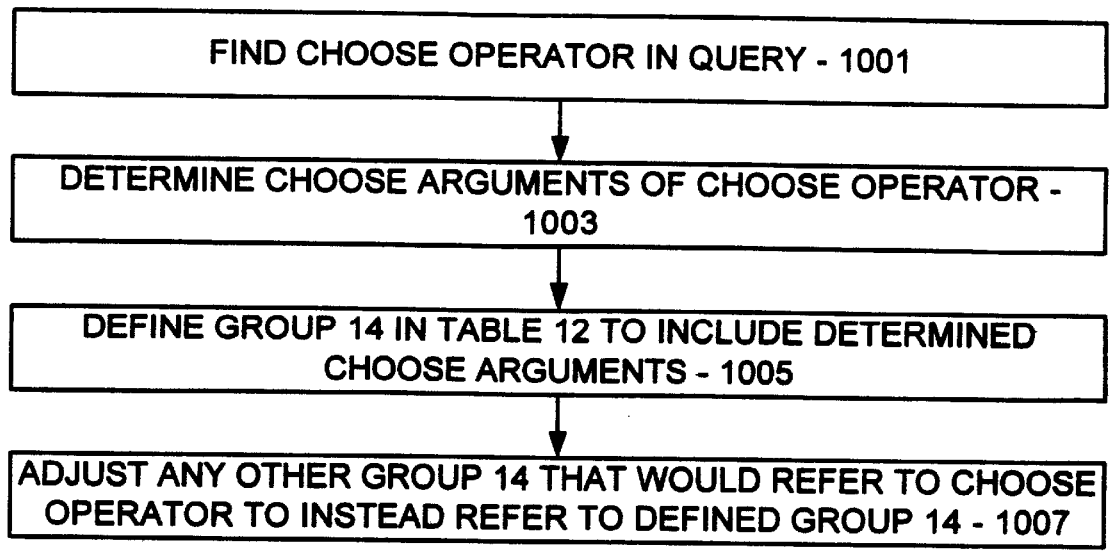
FIG. 10 is a flow diagram showing steps performed by the query optimizer in accordance with one embodiment of the present invention in handling the CHOOSE operator in the tree of FIG. 8 to form the table of FIG. 9.

In the present invention, then, in the course of the query optimizer algebra-izing the query as received to produce an initial tree 10, such as at step 503 of FIG. 5, the query optimizer in finding a CHOOSE operator in the query (step 1001 of FIG. 10) handles same by: determining the CHOOSE arguments of the CHOOSE operator (step 1003), defining a group 14 in the table 12 to include the determined CHOOSE arguments (step 1005), and adjusting any other group 14 that would refer to the CHOOSE operator to instead refer to the defined group 14 with the determined CHOOSE arguments (step 1007). Significantly, no other alteration to the process outlined in FIG. 5 is believed to be necessary.

Thus, and to summarize, the tree 10 as shown in FIG. 8 has three levels including a root (first) level with a first JOIN operator joining a CHOOSE operator and a Scan C operator from the next (second) level, and the CHOOSE operator joins a Scan A operator and Scan B operator from the next (third) level. Correspondingly, the initial table 12 as shown in FIG. 9 has three groups 14: Group 1 has Scan A and Scan B as members inasmuch as Scan A and Scan B are the CHOOSE arguments, Group 2 has Scan C as a member, and the Root Group has the JOIN of Group 1 (having Scan A and Scan B) and Group 2 (having Scan C) as a member.

Again, transformation rules are applied to each member in the table of FIG. 9 to produce additional members of groups and/or additional groups (not shown), and the query optimizer then assigns a cost value to each member of each group 14 and selects the lowest cost value member of each group 14. Notably, by defining Scan A and Scan B as equivalent members in Group 1, equivalents of Scan A and equivalents of Scan B are also placed in Group 1, all of the equivalents in Group 1 including Scan A and its equivalents and Scan B and its equivalents are assigned a cost value, and the lowest cost value member of all such members in group 1 is selected. Inherently, then, the more efficient one of Scan A or an equivalent thereof and Scan B or an equivalent thereof is selected.

Figure 11:
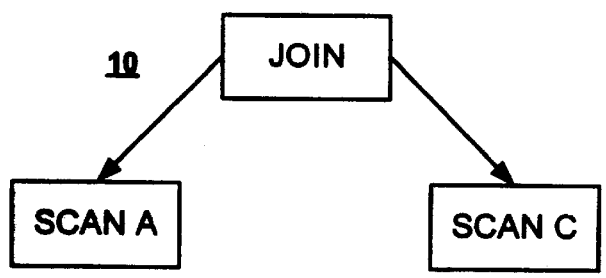
FIG. 11 is a block diagram showing the tree of FIG. 8 optimized in accordance with one embodiment of the present invention based on the lowest cost value member of each group of the table of FIG. 9.

Assuming for the sake of simplicity that no equivalents were found and the table 14 of FIG. 9 is unaffected by application of any transformation rules, and assuming again for the sake of simplicity that Scan A was found to have the lowest cost value over Scan B, the optimized tree 10 derived from the initial tree 10 of FIG. 8 is shown in FIG. 11. Again, based on the CHOOSE operator, the query optimizer has defined the CHOOSE arguments thereof as equivalents in a group 14, and the alternative forms of the sub-query as represented by the CHOOSE arguments are indistinguishable from other equivalent members in the same group 14. Note that since the CHOOSE operator is eliminated from the table 14, the query optimizer need not be concerned with any special rules or instructions in generating equivalents for the table 14. Quite simply, the costbased selection mechanism of the query optimizer is carried out as before, and the query optimizer chooses an optimal query expression from among multiple equivalent expressions including an appropriate one of the alternative forms of the query expressions that are the basis for the CHOOSE operator or an equivalent thereof.

Conclusion

The programming necessary to effectuate the processes performed in connection with the present invention is relatively straight-forward and should be apparent to the relevant programming public skilled in query optimization technology. Accordingly, such programming is not attached hereto. Any particular programming, then, may be employed to effectuate the present invention without departing from the spirit and scope thereof.

In the foregoing description, it can be seen that the present invention comprises a new and useful method and mechanism that allows a user or application to submit multiple alternate forms of a query expression in a manner so that a query optimizer selects the most efficient one of the forms of the query expression and optimizes same. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method of optimizing a query including therein at least one choice of at least a pair of equivalent forms, the query comprising operators and arguments relating to the operators, each choice being represented by a CHOOSE operator having at least a pair of CHOOSE arguments representing the corresponding pair of equivalent forms, an initial tree representation of the query including a node for each operator and each argument, each argument relating to an operator being represented in the tree as a child node of the node representing such operator, the method comprising:

generating an initial version of a lookup table, the generated lookup table including a group for each node of the initial tree other than the nodes for each CHOOSE operator and the CHOOSE arguments thereof, the generated lookup table including with regard to each CHOOSE operator node and the CHOOSE argument nodes thereof a single group having both CHOOSE argument nodes as members thereof, each operator being represented as a member within a group thereof as the operator and a reference to a group of each argument associated therewith;

generating any available equivalents for each group based on the initial version of the table, including generating at least one of:
an additional member of a group;
a new member of a new group; and
combinations thereof;

whereby for each group, every member thereof is an equivalent; and assigning a cost value to each member of each group and selecting a member of each group as a lowest cost value member of the group, the assigned cost value of each member reflecting a cost of such member and if the member implies one or more other groups a cost of the lowest cost value member of each implied group, the lowest cost value members of the groups defining an optimized tree for the query and thereby an optimization of the query.

2. The method of claim 1 further comprising executing the optimization of the query to produce query results.

3. The method of claim 1 wherein generating the initial version of the table comprises with regard to each CHOOSE operator node in the tree:
determining the CHOOSE argument nodes of the CHOOSE operator node;
defining a group in the table to include the determined CHOOSE argument nodes; and
adjusting any other group that would refer to the CHOOSE operator to instead refer to the defined group with the determined CHOOSE argument nodes.

4. A computer-readable medium having computer-executable instructions thereon for performing a method of optimizing a query including therein at least one choice of a pair of equivalent forms, the query comprising operators and arguments relating to the operators, each choice being represented by a CHOOSE operator having a pair of CHOOSE arguments representing the corresponding pair of equivalent forms, an initial tree representation of the query including a node for each operator and each argument, each argument relating to an operator being represented in the tree as a child node of the node representing such operator, the method comprising:

generating an initial version of a lookup table, the generated lookup table including a group for each node of the initial tree other than the nodes for each CHOOSE operator and the CHOOSE arguments thereof, the generated lookup table including with regard to each CHOOSE operator node and the CHOOSE argument nodes thereof a single group having both CHOOSE argument nodes as members thereof, each operator being represented as a member within a group thereof as the operator and a reference to a group of each argument associated therewith;

generating any available equivalents for each group based on the initial version of the table, including generating at least one of:
an additional member of a group;
a new member of a new group; and
combinations thereof;

whereby for each group, every member thereof is an equivalent; and assigning a cost value to each member of each group and selecting a member of each group as a lowest cost value member of the group, the assigned cost value of each member reflecting a cost of such member and if the member implies one or more other groups a cost of the lowest cost value member of each implied group, the lowest cost value members of the groups defining an optimized tree for the query and thereby an optimization of the query.

5. The medium of claim 4 wherein the method further comprises executing the optimization of the query to produce query results.

6. The medium of claim 4 wherein generating the initial version of the table comprises with regard to each CHOOSE operator node in the tree:
determining the CHOOSE argument nodes of the CHOOSE operator node;
defining a group in the table to include the determined CHOOSE argument nodes; and
adjusting any other group that would refer to the CHOOSE operator to instead refer to the defined group with the determined CHOOSE argument nodes.

7. A computer performing a method of optimizing a query including therein at least one choice of a pair of equivalent forms, the query comprising operators and arguments relating to the operators, each choice being represented by a CHOOSE operator having a pair of CHOOSE arguments representing the corresponding pair of equivalent forms, an initial tree representation of the query including a node for each operator and each argument, each argument relating to an operator being represented in the tree as a child node of the node representing such operator, the method comprising:

generating an initial version of a lookup table, the generated lookup table including a group for each node of the initial tree other than the nodes for each CHOOSE operator and the CHOOSE arguments thereof, the generated lookup table including with regard to each CHOOSE operator node and the CHOOSE argument nodes thereof a single group having both CHOOSE argument nodes as members thereof, each operator being represented as a member within a group thereof as the operator and a reference to a group of each argument associated therewith;

generating any available equivalents for each group based on the initial version of the table, including generating at least one of:
an additional member of a group;
a new member of a new group; and
combinations thereof;

whereby for each group, every member thereof is an equivalent; and assigning a cost value to each member of each group and selecting a member of each group as a lowest cost value member of the group, the assigned cost value of each member reflecting a cost of such member and if the member implies one or more other groups a cost of the lowest cost value member of each implied group, the lowest cost value members of the groups defining an optimized tree for the query and thereby an optimization of the query.

8. The computer of claim 7 wherein the method further comprises executing the optimization of the query to produce query results.

9. The computer of claim 7 wherein generating the initial version of the table comprises with regard to each CHOOSE operator node in the tree:

determining the CHOOSE argument nodes of the CHOOSE operator node;

defining a group in the table to include the determined CHOOSE argument nodes; and adjusting any other group that would refer to the CHOOSE operator to instead refer to the defined group with the determined CHOOSE argument nodes.

* * * * *